United States Patent [19]

Chaloux

[11] Patent Number: 5,764,156
[45] Date of Patent: *Jun. 9, 1998

[54] TRANSPONDER DETECTOR

[75] Inventor: Christian Chaloux, Mirabel, Canada

[73] Assignee: Ilco Unican Inc., Montreal, Canada

[*] Notice: The term of this patent shall not extend beyond the expiration date of Pat. No. 5,739,766.

[21] Appl. No.: 678,139

[22] Filed: Jul. 11, 1996

[51] Int. Cl.$^6$ .................................................. H04Q 1/00
[52] U.S. Cl. ...................... 340/825.31; 340/825.54; 342/42
[58] Field of Search ............. 340/825.31, 825.34, 340/825.54, 572, 573; 342/42, 44

[56] References Cited

U.S. PATENT DOCUMENTS

| | | | |
|---|---|---|---|
| 3,898,619 | 8/1975 | Carsten | 340/572 |
| 4,945,354 | 7/1990 | McColl | 340/825.31 |
| 4,963,887 | 10/1990 | Kawashima | 342/42 |
| 5,086,288 | 2/1992 | Stramer | 340/825.31 |
| 5,347,263 | 9/1994 | Carroll | 340/825.31 |
| 5,416,471 | 5/1995 | Trehame | 340/825.31 |
| 5,461,386 | 10/1995 | Knebelkamp | 340/825.31 |
| 5,469,727 | 11/1995 | Spahn | 340/825.31 |
| 5,532,522 | 7/1996 | Dietz | 340/825.31 |
| 5,541,583 | 7/1996 | Mandelbaum | 340/825.54 |

*Primary Examiner*—Brian Zimmerman
*Attorney, Agent, or Firm*—Fishman, Dionne, Cantor & Colburn

[57] ABSTRACT

The transponder detector has an antenna for radiating a power signal to an identification transponder of an unidentified type and for reading a response signal characteristic from the transponder. A plurality of power signal and response signal characteristic parameters associated with transponder communication protocols are serially selected and implemented while an analysis of the response signal characteristic is carried out to determine whether the response signal characteristic matches the selected parameters and to produce an identification match signal. The result of the match signal is displayed as text identifying the transponder make and model number on an LCD display, in the case of a hand-held universal transponder detector. The device is particularly useful for confirming the presence and type of transponders embedded in the head of keys.

10 Claims, 5 Drawing Sheets

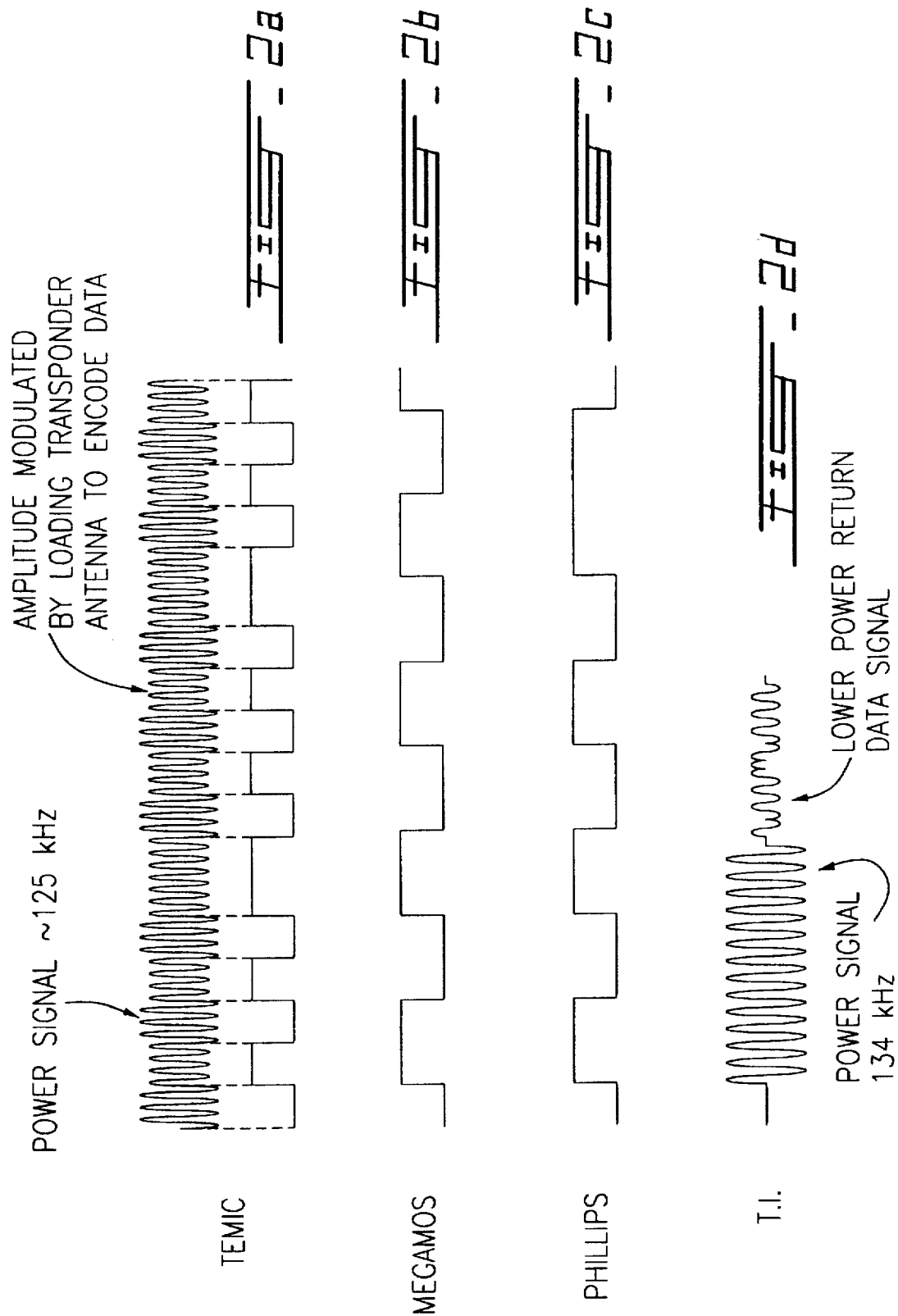

TRANSPONDER DETECTOR

TECHNICAL FIELD

This invention relates to the detection of the type of wireless identification transponders.

BACKGROUND OF THE INVENTION

Transponders using RF wireless communication technology have existed for several years. The transponder is a small electronic device, normally encapsulated in a plastic or epoxy based medium, which has an internal antenna and is powered by an alternating magnetic field with a specific spectrum radiated from a source antenna, and re-transmits back to the source antenna a series of digital codes which provide a unique identification of the transponder.

While transponders made by various manufacturers have similar general characteristics, there is no standard protocol for transponders. In fact, for security reasons, it may be desirable that a transponder protocol is different and unique to permit reading only by a transponder reader specific to the transponder. Of the several known manufacturers of transponders, all make use of completely different protocols, which involve different characteristics, such as the communication carrier frequency, power levels and the method of signal modulation for data encoding.

Recently, the automotive industry has moved to integrate transponders in car ignition keys in order to reduce car theft. Such a key is referred to as a transponder key and has the transponder capsule molded in the plastic part of the key head and there is no visual distinction between the transponder key and a regular automobile ignition key. A description of one type of automobile transponder key system is described in Issue No. 11, 1994, of TIRIS™ News, the International Newsletter of the Tiris Group, by Texas Instruments. The automobile central control computer is provided with a special circuit for driving a coil antenna embedded in the automobile's console around the ignition key cylinder. When the ignition key is turned, the antenna radiates an RF carrier signal to the head of the key, thus energizing a circuit in the transponder. The transponder signals back to the antenna a digital code corresponding to an identification number. If the identification number is approved by the car's central control computer, ignition is then permitted to continue, otherwise, the ignition is shut down, fuel injection is disabled and the engine electronics are disarmed.

The introduction of transponder keys poses a problem for the lock industry since key cutters must stock both regular keys for models of cars not using transponder keys, and also new key blanks containing transponders. For the locksmith, a decision must be made when proceeding to copy an automobile key, whether a transponder containing blank is required or not. Furthermore, in the case that a given automobile manufacturer utilizes more than one type of transponder, it is necessary to identify which type of transponder is present in the car owner's key before selecting a similar transponder key blank for copying of the key.

SUMMARY OF THE INVENTION

It is an object of the present invention to provide an easy-to-use device for detecting and identifying a transponder. It is an object of the invention to provide such a transponder detector device to provide a locksmith with an indication of whether a transponder is present, and if so, the transponder type in order that an appropriate transponder key blank may be selected.

It is a further object of the present invention to provide a transponder detector able to identify any one of a plurality of transponder types in order to permit a lock system to function with a plurality of transponder types.

According to the invention, there is provided a transponder detector apparatus comprising antenna means for radiating a power signal to an identification transponder of an unidentified type; signal detecting means for reading a response signal characteristic from the transponder; and protocol analyzer means for determining whether the response signal characteristic matches a predetermined general characteristic identifying a type of transponder and for producing an identification match signal. In this way, a user may confirm a type of an unknown transponder. Preferably, the protocol analyser means determines whether the response signal characteristic matches one of a plurality of predetermined general characteristics identifying different types of transponders. The apparatus according to the invention may also comprise protocol select means for serially selecting each of a plurality of power signal and response signal characteristic parameters, while the protocol analyzer means may preferably determine whether the response signal characteristic matches the selected parameter.

The antenna means preferably comprise a single coil antenna. The protocol select means and the protocol analyzer means may comprise dedicated circuitry for each of the power signal and response signal characteristic parameters corresponding to each of the transponder types to be identified. Preferably, however, a microprocessor is provided to digitally control the power signal, and to logically determine whether response signal characteristics are present in the signal read from the transponder to determine whether the response signal characteristics match the selected parameter. The protocol analyzer means may comprise circuits for identifying distinct characteristics, or the signal read may be digitized and analyzed by a microprocessor.

In a preferred embodiment of the invention, a hand-held device is provided which provides a visual display of the identity of a transponder type held in proximity to the antenna means in order to identify the type of transponder hidden in the head of an automobile key.

BRIEF DESCRIPTION OF THE DRAWINGS

A preferred embodiment of the present invention will now be described with reference to the accompanying drawings in which:

FIGS. 2a and 2d are schematic representations of the antenna signals resulting from interaction with two different types of transponders, and FIGS. 2a, 2b and 2c show schematically the digital signal encoded in the antenna signal shown in FIG. 2a;

DETAILED DESCRIPTION OF THE PREFERRED EMBODIMENT

Figure 1:
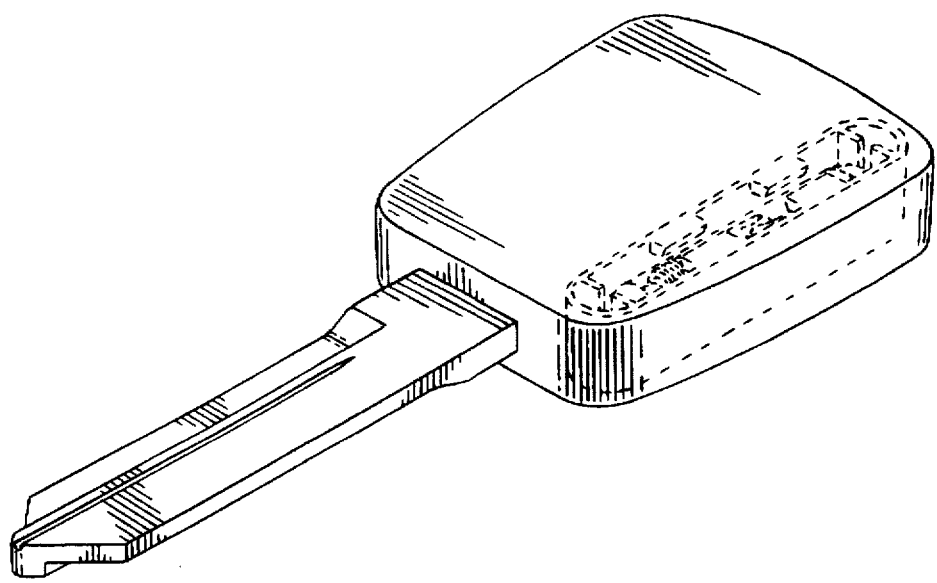
FIG. 1 is an illustration of an automobile key having an encapsulated transponder embedded in the plastic head of the key as is known in the art.

In the preferred embodiment, the transponder detector apparatus detects a transponder embedded in the plastic head of an automobile key of known construction as illustrated in FIG. 1. An RF coil which is mounted around the cylinder of the ignition lock to be in a plane perpendicular to an axis of the key shaft, produces an RF signal which is received by a coil antenna in the transponder capsule and is used to power up a microcircuit in the transponder. The transponder circuit then signals back to the radiating coil digital data corresponding to an identification code in the transponder.

Four types of signaling protocols are illustrated in FIG. 2. In FIG. 2d, a protocol used by Texas Instruments (e.g. TIRIS™ glass capsule model RI-TRP-RRHP) is illustrated. When the transponder receives a carrier signal of 134 kHz, it is powered up. When the carrier signal ceases to continue, the energized transponder circuit radiates back a digitally modulated signal containing either 32 or 64 bits and the frequency of the response signal is also 134 kHz. The total time required to energize the transponder and read the returned data signal is less than 100 milliseconds. In FIGS. 2a through 2c, the protocol presently used by TEMIC, Megamos and Philips (e.g. Philips model PCF 7930L), is illustrated. A 125 kHz carrier signal is provided to the energizing antenna, and once the transponder is energized, its microelectronic circuit connects and disconnects its internal antenna to an internal load in a manner corresponding with the digital identification number contained in the microelectronic circuit. The radiating antenna in the lock is able to detect the rapid change in impedance caused by the connection and disconnection of the load within the transponder's antenna and obtains the digital identification code from such detection. To distinguish between the three types of such amplitude modulated digital encoding transponders, the number of cycles (i.e. the duration) of the encoded pulses is detected. The TEMIC transponder has small and medium pulses, the Megamos has only medium pulses, and the Philips has medium pulses for the data and a large pulse identifying a data separator.

The parameters which may be varied in such transponders are the energizing or power signal frequency, the power signal duration, the power signal level, whether the information is sent to the lock by a separate signal using stored power or whether load modulation in the transponder antenna is used, in addition to the specific type of data encoding (pulse length and encoding protocol) that is used in order to relay the serial number. An additional parameter which may be varied is, of course, the number of bits in the identification code.

Figure 3A:
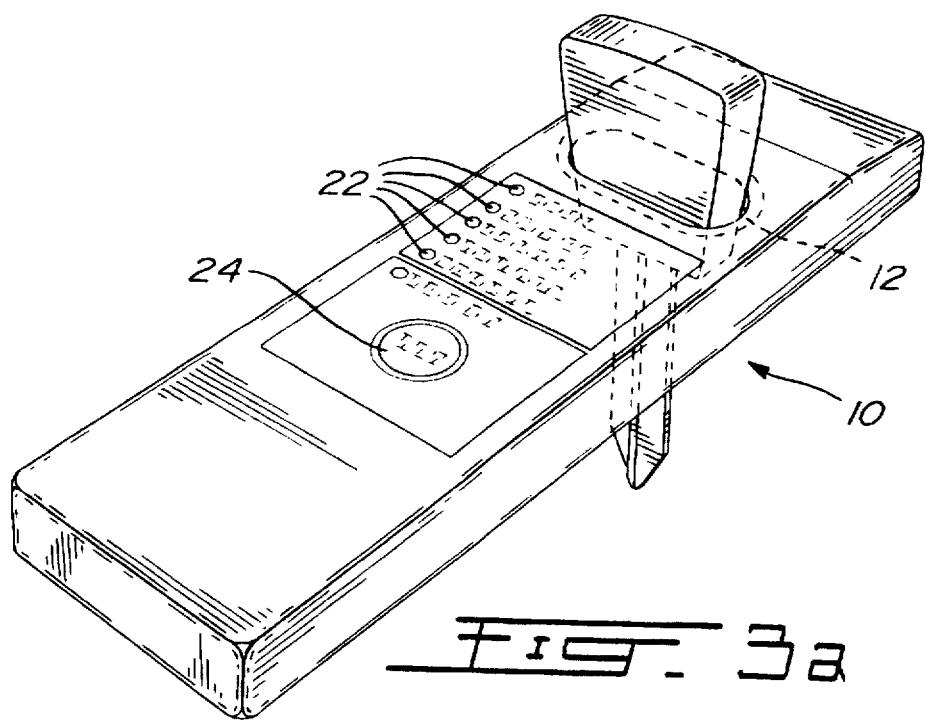
FIGS. 3a and 3b illustrate the transponder detector apparatus according to the preferred embodiment in which a transponder key of an unknown type is being identified.
Figure 3B:
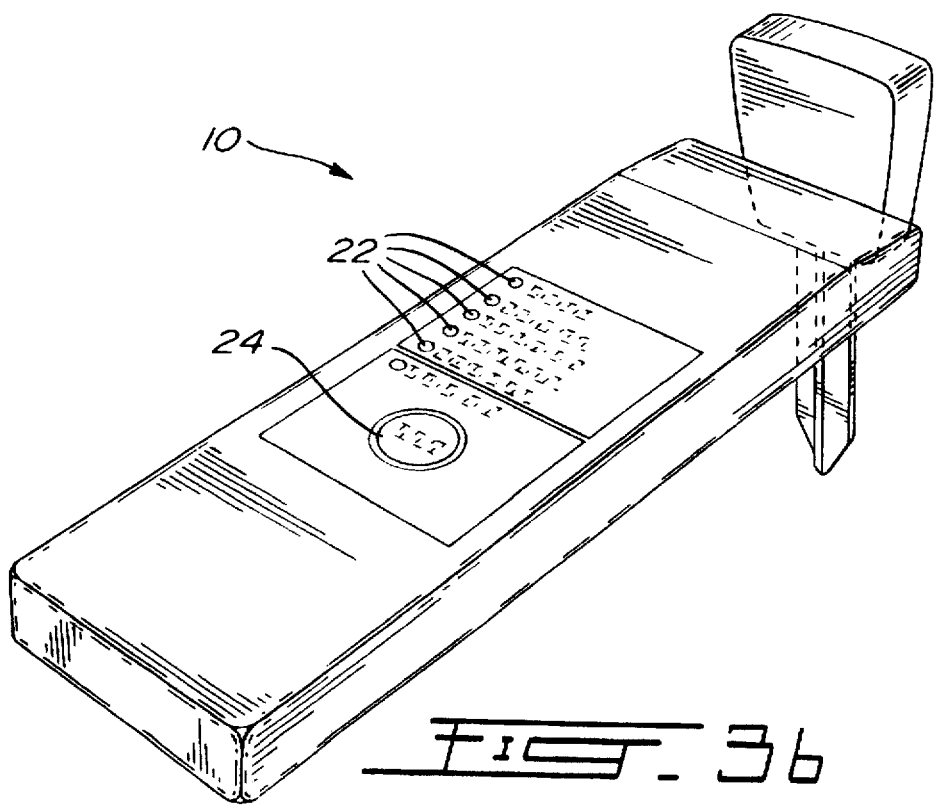

In the preferred embodiment, the transponder detector apparatus 10 illustrated in FIGS. 3a and 3b, is a hand-held unit. The key may be inserted into a drop-in holder as in the case of FIG. 3a, or may be held in front of the unit as illustrated in FIG. 3b. An antenna coil 12 illustrated in FIG. 3a is an obround coil and the opening through which the key is inserted has a hole in a bottom of the housing for the shaft of the key while the transponder containing head of the key is supported on the edge of the hole. The coil 12 contained within the unit provides the necessary RF field for providing the power signal and is also used for reading the response signal from the transponder. An "ON" button 24 is used to power up the circuit and after detection is completed, provides the identification of the transponder type on display 22. The display 22 in the preferred embodiment is a series of LEDs provided adjacent identifying text, but of course other forms of displays such as an LCD screen could be substituted. In the case that the display 24 is a text display and no successful identification is made after a period of a few seconds, the display will show text reading, for example, "no transponder present". In the case that LEDs alone are used, as in the preferred embodiment, an LED is illuminated upon pressing the "ON" button and failure to identify a transponder will result in no other LED 22 being illuminated. If a transponder type is identified, the associated LED 22 is illuminated. In the case of an LCD display, the brand name of the transponder type, or a model type identification for the appropriate key blank could be presented.

Figure 4:
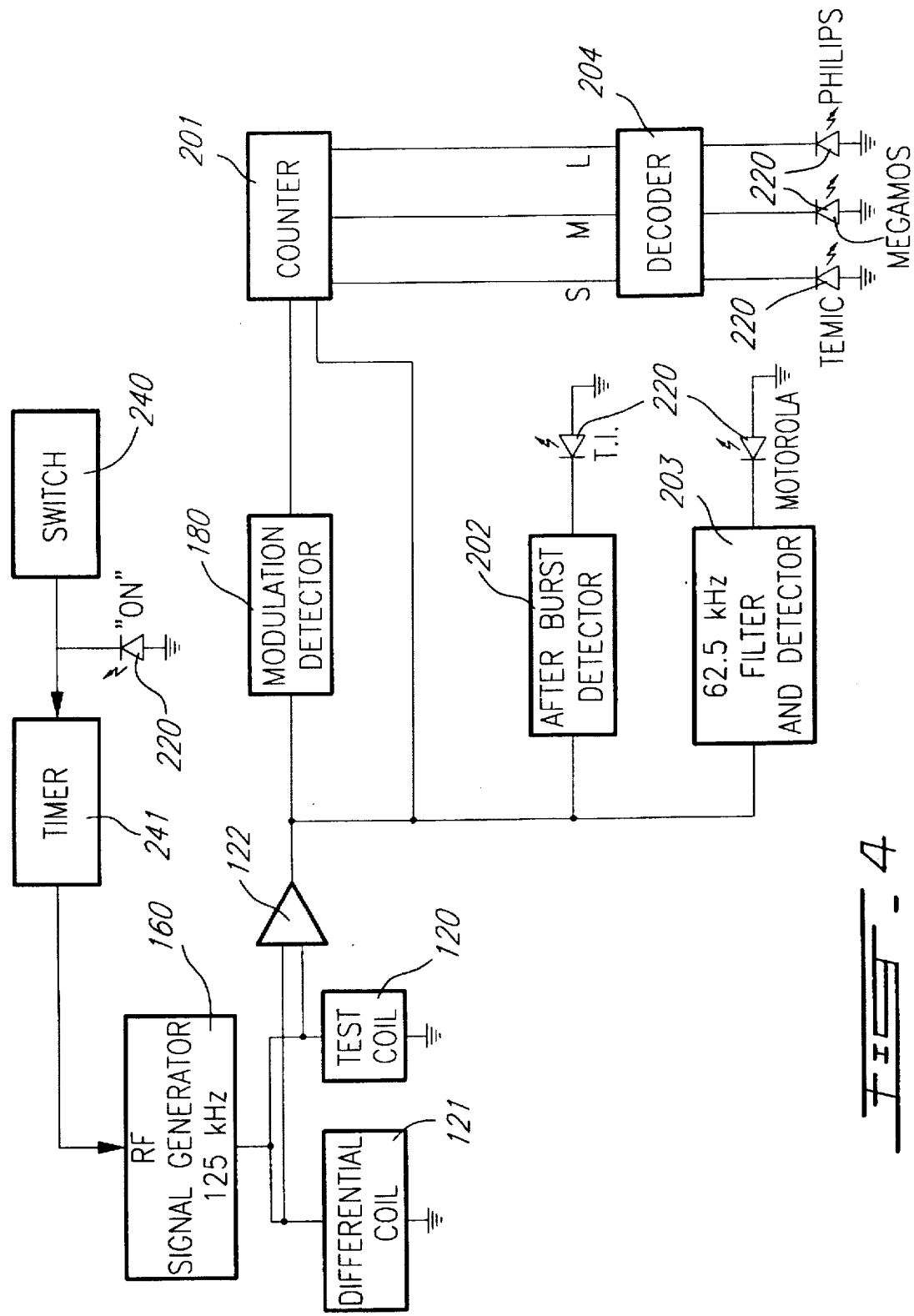
FIG. 4 is a detailed block diagram of an embodiment of the invention in which dedicated circuitry is used to identify five types of transponders.

In the embodiment of FIG. 4, dedicated circuitry is provided for detecting either a Texas Instruments transponder (e.g. an afterburst signal), a Motorola transponder having a characteristic signal response frequency of 62.5 kHz, or a Philips type transponder using amplitude modulation of the 125 kHz signal. As a compromise, a single frequency of 125 kHz is generated by RF signal generator 160, whereas each different type of transponder used may respond best to a different frequency. Generator 160 operates for brief sequential time intervals (with pauses between operation) as timed by timer 241 in response to pressing switch 240. The test coil 120 is connected in parallel with a differential coil 121 which is housed within the apparatus casing 10 so as not to interact with the transponder. A differential amplifier 122 generates a sensitive difference signal. Amplitude modulation in the difference signal is detected by detector 180 which produce a digital output.

A counter 201 counts the number of cycles in the difference signal during each pulse and outputs a logic signal on one of lines S, M and L depending on the cycle count, i.e. whether the pulse duration is short, medium or large. The decoder 204 includes logic for energizing the TEMIC LED 220 when both S and M pulses are detected. The Megamos LED 220 is energized when only M pulses are detected. The Philips LED 220 is energized when M and L pulses are detected.

An afterburst detector 202 detects the presence of a weaker return signal during the pause between two sequential power signals. If a return signal is present, then the T.I. LED 220 is energized.

A 62.5 kHz filter and signal detector circuit 203 detects the presence of a 62.5 kHz component in the differential signal which is characteristic of the Motorola Indala™ transponder. If such signal is detected, the Motorola LED 220 is energized.

Figure 5:
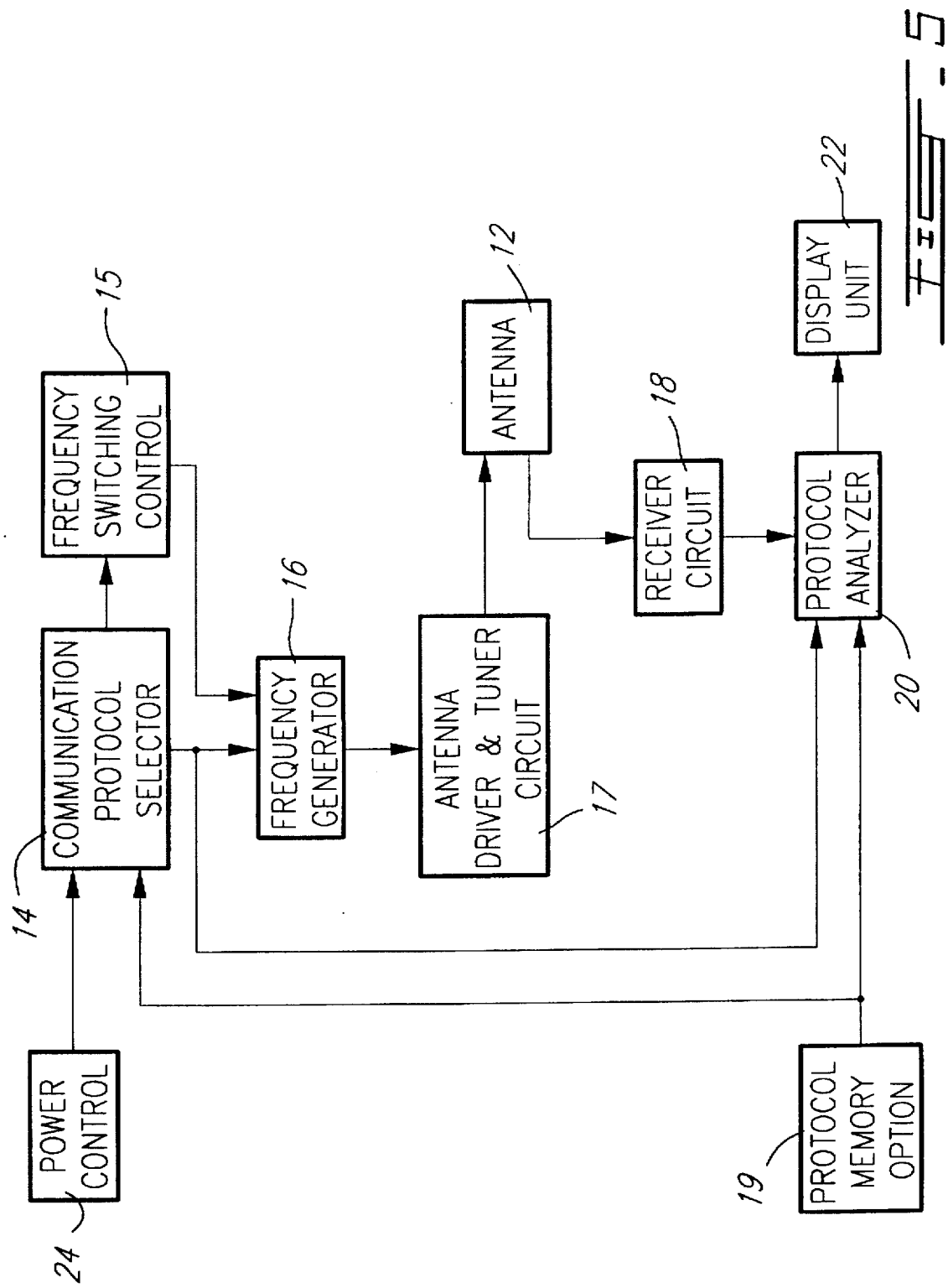
FIG. 5 is a schematic block diagram of the transponder detector apparatus according to the preferred embodiment.

In the preferred embodiment illustrated in FIG. 5, a microcontroller is to be implemented for the communication protocol selection, analysis and identification text display. The transponder detector 10 comprises an antenna 12 which is controllably powered by a frequency generator 16 and an antenna driver and tuner circuit 17. A receiver circuit 18 reads the response signal obtained from the transponder. The microcontroller provides a communication protocol selector 14 which selects a series of protocols from a protocol memory 19 for controlling the frequency generator and frequency switching control as well as setting the conditions used in the protocol analyzer 20. When the protocol analyzer positively identifies a transponder, the transponder identification signal is provided to a display unit 22 which displays on an LCD screen the corresponding text identifying the model or make of the transponder, or even the model of the key blank to be used.

When the "ON" button 24 is pressed, the protocol selector 14 selects its first protocol type from memory 19 and signals to the frequency switching control and frequency generator units 15 and 16 the necessary control data to specify the power signal burst frequency, level and duration. The frequency generator circuit output is fed into the antenna driver and tuner circuit 17 to radiate the appropriate signal to the coil antenna 12. The receiver circuit 18 may comprise circuitry as illustrated in FIG. 4 in which an RF signal and an AM signal output is provided. The protocol analyzer circuit 20 is switched into the mode associated with the protocol selected by circuit 14. The protocol analyzer means 20 could comprise a low level response signal detector such as the Texas Instruments transponder detector circuit illustrated in FIG. 4 as well as the AM signal detector used in the Philips transponder detector illustrated in FIG. 4 with the detector outputs being fed to a microcontroller the microcontroller for determining whether the response signal present corresponds to the protocol selected for generating the identification match signal. The protocol analyzer means 20 may comprise circuitry for detecting response signal levels and durations. The criteria required for identifying a type of transponder response signal may be stored in protocol memory 19 and accessed by protocol analyzer 20. Once the protocol selector 14 has selected the first power signal characteristics for the first protocol, the next power signal characteristics are selected for the next protocol until all protocols stored in the protocol memory have been attempted. If the protocol analyzer fails to positively identify the presence of a response signal having characteristics matching those stored in the protocol memory 19, then an appropriate signal is sent to display 22 for a text message to be displayed indicating that no transponder is present or has been identified. In the case that the protocol analyzer 20 has recognized the presence of either an RF signal following the power signal or an AM signal component, but such signals do not match the characteristics expected from the protocol memory 19, then a message indicating that a transponder of unknown type is present may be displayed.

In the preferred embodiment, the protocol memory 19 is a non-volatile memory. To ensure that the device is capable of recognizing new models of transponders as they become available, the protocol memory is replaceable by replacing a memory chip. Alternatively, the memory could also be updated via a data interface.

While the protocol analyzer may be simplified by having dedicated circuitry for detecting certain signal components, it is also possible to digitize the RF signal and carry out subsequent digital analysis of the signal to determine whether modulation is present, whether a response signal after the power signal is present, along with associated power levels, durations, frequencies and data bit stream length.

While it can be appreciated that the apparatus according to the present invention is a useful tool for locksmiths looking to identify the type of transponder embedded in the head of a key to be copied, it can also be appreciated that the apparatus according to the present invention may be applied to electronic lock circuitry which is to be made compatible with different types of transponders, whereby the transponder type can be identified so that the electronic lock knows what to do with the response signal and its data.

In another embodiment, the RF signal frequency of generator 160 is changed for each different type of transponder using a low frequency oscillator providing a 10 Hz switching signal for switching between the Texas Instruments mode and the Philips type mode. When in the Texas Instruments mode, the oscillator frequency of the oscillator circuit powering the coil antenna is set to 134 kHz, and when in the Philips mode, the frequency is set to 125 kHz. In the Texas Instruments detect mode, the presence of signal after coil energization is detected, the result of which is to turn on an LED 22. In the Philips transponder detector dedicated circuitry, the presence of an AM signal component during energization of the coil antenna at 125 kHz is detected, the result of which energizes one of the other LEDs 22. The circuit is powered by pressing the power "ON" switch 24 which results in one of LEDs 22 being powered "ON" in order to indicate that the circuit is operating.

I claim:

1. A transponder detector apparatus comprising:

antenna means for radiating a power signal to an identification transponder of an unidentified type;

signal detecting means for reading a response signal characteristic from the transponder; and protocol analyzer means for determining whether the response signal characteristic matches a predetermined general characteristic identifying a type of transponder and for producing an identification match signal, whereby a user may confirm a type of an unknown transponder.

2. The apparatus as claimed in claim 1, wherein said protocol analyser means determine whether said response signal characteristic matches one of a plurality of predetermined general characteristics identifying different types of transponders.

3. The apparatus as claimed in claim 2, further comprising:

protocol select means for serially selecting each of a plurality of power signal and response signal characteristic parameters, said protocol analyzer means determining whether the response signal characteristic matches said selected parameter.

4. The apparatus as claimed in claim 2, further comprising display means receiving the identification match signal for indicating the type of transponder identified, if any.

5. The apparatus as claimed in claim 4, wherein said display means comprise a text display.

6. The apparatus as claimed in claim 2, wherein said analyzer means comprise a plurality of dedicated detection circuits for analyzing said response signal and producing said identification match signal for each one of said protocols, and said protocol select means comprise switching means for serially activating each of said detection circuits.

7. Apparatus as claimed in claim 1, further comprising a housing, said housing including an aperture for receiving a shaft of a key, said aperture having an upper lip for engaging and retaining a head of said key, and said antenna means comprise a circular coil substantially coaxial with said aperture.

8. Apparatus as claimed in claim 7, wherein said aperture is provided within a recess in said housing, and said coil surrounds said recess, whereby an RF field of said coil has its greatest intensity nearer to said key head.

9. Apparatus as claimed in claim 3, further comprising non-volatile protocol memory for providing protocol data to said protocol select means and said protocol analyzer means.

10. Apparatus as claimed in claim 9, wherein said protocol memory is replaceable to facilitate updating.

* * * * *